May 16, 1944. J. T. LIGGETT 2,349,100
FINAL DRIVE CASING BRACE
Filed March 23, 1942 2 Sheets-Sheet 1

Inventor
J. T. Liggett
by Miles Henninger
Attorney

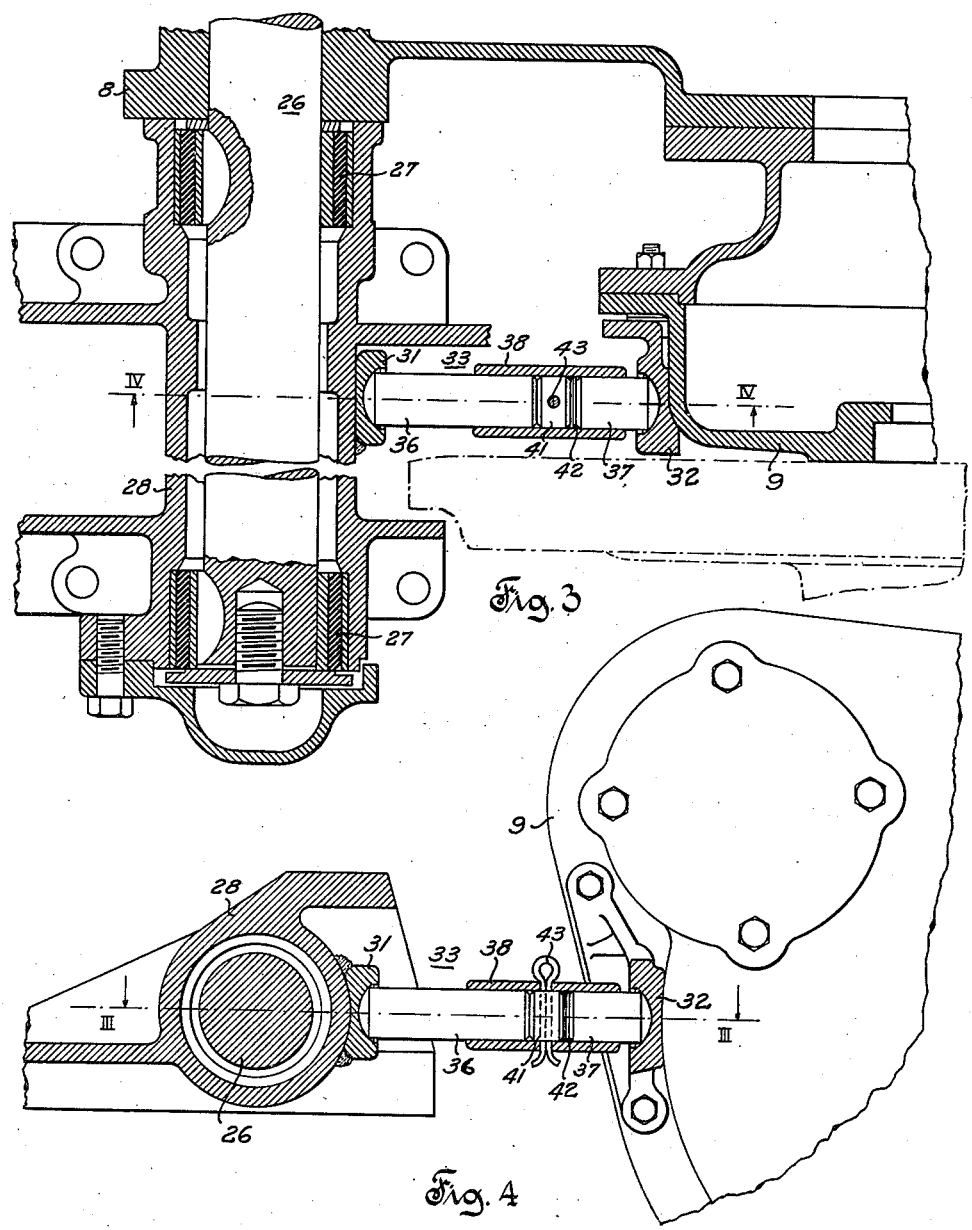

Patented May 16, 1944

2,349,100

UNITED STATES PATENT OFFICE 2,349,100

FINAL DRIVE CASING BRACE

John T. Liggett, Springfield, Ill., assignor to Allis-Chalmers Manufacturing Company, Milwaukee, Wis., a corporation of Delaware Application March 23, 1942, Serial No. 435,797

5 Claims. (Cl. 305—9)

The invention relates to improvements in vehicles of the track laying or crawler type and more particularly to a bracing between the crawler track frame and the final drive casing of crawler type tractors.

When a crawler type tractor is used under conditions which introduce obstructions between the track parts and particularly between the track and the sprocket wheel for driving the track, such obstructions tend to shorten the distance between the axis of the sprocket and the axis of the pivot axle by which the tractor frame and all tractor parts mounted thereon are connected with the track supporting frame and other parts of the track laying mechanism. Such shortening of the distance imposes severe bending loads on the sprocket shaft, which loads are transmitted through the shaft bearings to the final drive casing in which the sprocket shaft is journaled, and eventually to the transmission casing of the tractor. These bending loads cause severe deflections in the pivot axle shaft and the final drive casings or even result in the actual breakage of casing portions. It has been found that such damage to the transmission or final drive casings can be entirely avoided if what are in effect rigid beams are placed between the final drive casings and the pivot axle to prevent shortening of the distance between such axle and the sprocket wheel and thereby preventing the displacement of the sprocket wheel shaft.

It is therefore an object of the present invention to provide means between the track frame and the sprocket wheel shaft suports of a crawler type tractor which will maintain the spacing therebetween and prevent the displacement of either the sprocket shaft or the pivot axle when free movement of the crawler track is obstructed.

Another object of the invention is to provide braces retained under all conditions of operation, on the line through the axes of the sprocket shaft and the pivot axle of a crawler type tractor, to prevent transmitting of the compressive stress, which may be developed in the crawler track, to the transmission casing or final drive casing.

Another object of the invention is to provide braces which are in effect rigid beams between the sprocket shaft supports and the pivot axle of a crawler tractor, but in which the braces are so mounted as to permit oscillation of the truck frame on the pivot axle without affecting the spacing of the pivot axle in relation to the sprocket shaft.

Objects and advantages other than those above set forth will be apparent from the following description when read in connection with the accompanying drawings, in which.

Figure 1:
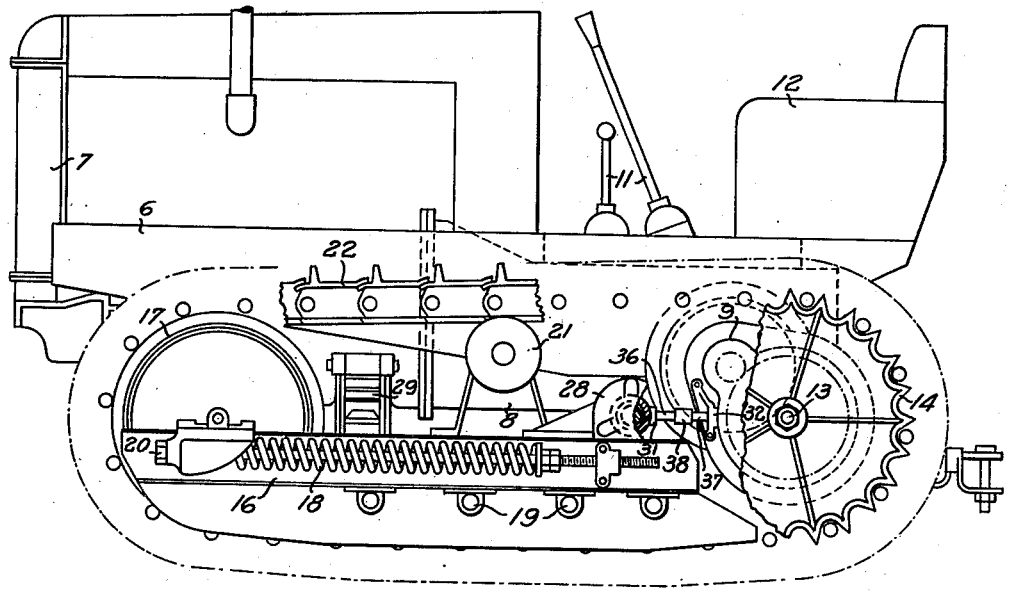
Fig. 1 is a side elevational view of a crawler type tractor with the track indicated only diagrammatically and with parts of both the sprocket wheel and the pivot axle bracket cut away to illustrate particularly the location in a vertical direction, of the braces inserted between the sprocket shaft housing and the pivot axle bracket.
Figure 2:
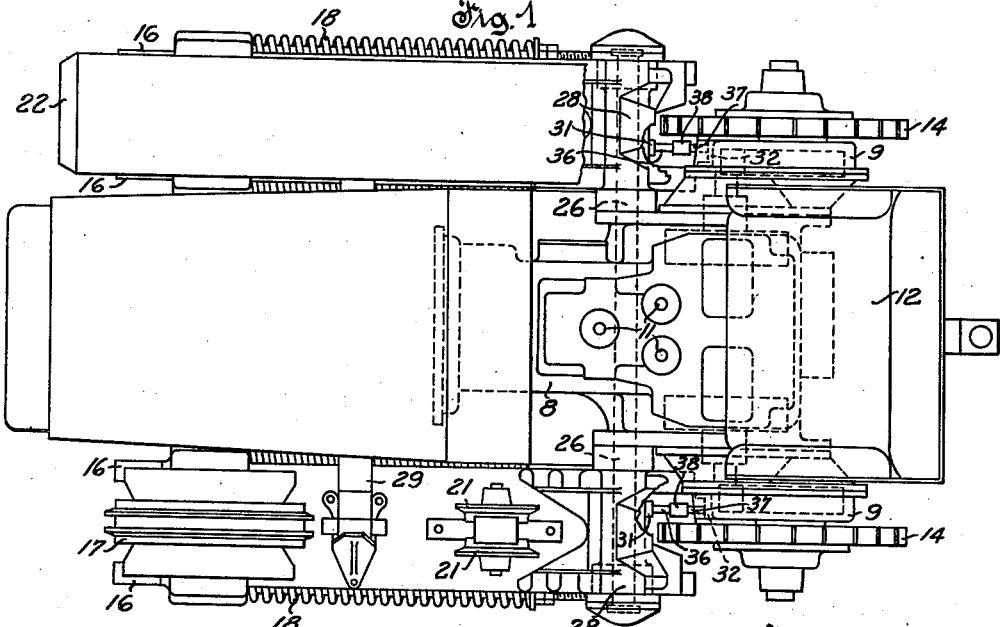
Fig. 2 is a top plan view similar to the view shown in Fig. 1, except that a portion of the pivot axle bracket only is cut away, to show the location of the braces internally of the sprocket wheel and extending from the pivot axle bracket to a portion of the tractor final drive casing.

Fig. 3 is an enlarged horizontal sectional view, taken on the line III—III of Fig. 4, to illustrate the detailed construction of the braces and the manner of mounting the same on the pivot axle brackets and on the final drive casings adjacent the bearings for the track driving sprockets; and Fig. 4 is an enlarged vertical sectional view, taken on the plane of the line IV—IV of Fig. 3, and further illustrating the detailed construction and mounting of the braces.

Referring more particularly to the drawings by characters of reference, the reference numeral 6 designates the main frame of a crawler type tractor on which frame is mounted a radiator indicated at 7, an engine (not shown), transmission gearing in a casing indicated at 8, final drive gearing in casings indicated at 9, engine transmission and control levers collectively indicated at 11, and an operator's seat 12. Power is transmitted through the usual transmission gearing and through the usual final drive gearing to shafts 13 for sprocket wheel 14. The shafts 13 for the sprocket wheels 14 are journaled in and extend externally from the final drive casing 9. The track laying mechanism for the tractor comprises frames 16 on which are mounted idlers 17 movably held in position by track release springs 18 on adjusting bolts 20 which allows for taking up of slack in the crawler tracks. Mounted in the track frame 16 are a plurality of track rollers with only their axles 19 shown in the drawings, the track rollers serving the purpose of supporting the weight of the tractor on the lower run of the track. A support roller 21 is mounted on the top of each of the track frames 16 to support that portion of the tracks 22 running from the sprocket wheels 14 to the idlers 17. Pivot axle 26 is fixed in and extends from the sides of the transmission casing 8 for support in rubber torque bushings 27 fixed in brackets 28 which are mounted on each of the track frames 16 and form pivots permitting relative movement of the track frame 16 with respect to the main frame 6 and the final drive housing 9. Another connection is made between the main frame and the track frame by a leaf spring assembly 29 connected in the center thereof with the main frame 6, and connected at the ends thereof with the track frames 16.

The pivot axle brackets 28 each have attached thereto or formed thereon sockets 31 with a spherically surfaced seat. The sockets are on the rear side of the brackets and are so placed or formed that the center of each spherical seat is on the center line of the associated pivot axle. Sockets 32, similar to sockets 31, are mounted on (by bolting as shown) or formed integral with the final drive casing 9 in which the sprocket shafts 13 are journaled. The sockets 32 are placed or formed facing the sockets 31 and with the centers of the spherical seats of the sockets 32 on the center line of the associated sprocket axles. The sockets on each side of the tractor are also mounted as nearly as possible on the center lines of the several track frames. The sockets are arranged in opposed pairs and are adapted to severally receive the ends of braces generally indicated in Figs. 3 and 4 at 33, which braces are intended to fit snugly between the sockets.

The braces are each made up of end pieces 36 and 37 with each end piece having one end thereof shaped as a portion of a sphere to fit into the spherical seats in the sockets 31, 32 and with the other end of the end pieces cut off at right angles to the longitudinal axes through the pieces. Each brace has a sleeve 38 made to fit closely over the end pieces and keep the axes of the end pieces in line with each other. The combined length of the end pieces 36 and 37 is necessarily less than the distance between the socket seats 31, 32 and such end pieces are spaced from each other by a spacer 41 and a group of shims 42. The sleeves hold the spacers and shims in line with the longitudinal axes of the end pieces and are themselves held in position by a cotter pin 43 passing through the sleeve 38 and through the spacer 41.

It will be understood that the braces are assembled in the position shown either when no stress is placed on the track or with a stress applied in the direction opposite to the stress produced by obstruction in the track when the vehicle is running. Such opposite stress can be produced by placing a block under one track, thus allowing the other track to oscillate to its lowest position, at which time as many shims as possible are placed in the brace on the lower positioned track. The block is then placed under the other track and the above procedure follows with respect to the other brace. A preloading of the braces is thus provided, which compensates for the initial wearing of the braces in fitting themselves into the sockets. The braces therefore provide as nearly as possible rigid beams socketed to be capable of universal movement at the ends thereof and always remaining substantially in a plane through the axes of the pivot axle and the sprockets and approximately on the center line of the tracks. These braces prevent the displacement of the sprocket shaft housing (the final drive casing) with respect to the pivot axle bracket, by any obstruction in the track or obstruction between the track and the sprocket or between the track and idler. Because the axes of the braces extend substantially between the center lines of both the sprockets and the pivot axle, relative movement therebetween does not cause the braces to leave their seats in the sockets. If any wear occurs in the sockets, or on the ends of the braces, it is only necessary to add sufficient shims to keep the ends of the braces firmly seated in their respective sockets.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a tractor of the crawler type, a main frame, a final drive casing mounted on said main frame, a track frame, a track supported on said track frame, a sprocket wheel journaled in said casing and driving said track, sockets mounted on said casing and on said track frame, and a brace extending between said sockets and substantially parallel with the longitudinal axis of the tractor to transmit stresses from said sprocket to said track frame.

2. In a tractor of the crawler type, a main frame, final drive casings mounted on said main frame, a transmission casing mounted on said main frame, track frames, an axle mounted in said transmission casing and having the ends extending therefrom, brackets mounted on said track frames for receiving the extending ends of said axle to permit pivotal movement between said frames, tracks severally supported on said track frames, sprocket wheels journaled in said final drive casings and driving said tracks, sockets mounted on said final drive casings, sockets mounted on said brackets, and braces extending betwen said sockets for transmitting stresses from said sprockets to said track frames.

3. In a tractor of the crawler type, a main frame, final drive casings mounted on said main frame, a transmission casing mounted on said main frame, track frames, an axle mounted in said transmission casing and having the ends extending therefrom, brackets mounted on said track frames for receiving the extending ends of said axle to permit pivotal movement between said frames, a track supported on each of said track frames, a sprocket wheel journaled in each of said final drive casings and driving said tracks, sockets severally mounted on said final drive casing, sockets severally mounted on said brackets, and braces extending between said sockets for transmitting stresses from said sprockets to said track frames, the centers of said sockets being in a plane determined by the axes of said axle and the shafts of said sprockets and being on substantially the longitudinal center line of said tracks.

4. In a tractor of the crawler type, a main frame, final drive casings mounted on said main frame, a transmission casing mounted on said main frame, track frames, an axle mounted in said transmission casing and having the ends extending therefrom, brackets severally mounted on said track frames for receiving the extending ends of said axle to permit pivotal movement between said frames, tracks severally supported on said track frames, sprocket wheels severally journaled in said final drive casings and driving said tracks, sockets mounted on said final drive casings, sockets mounted on said brackets, said sockets being arranged in opposed pairs on each side of the tractor and the centers thereof being in a plane determined by the axes of said axle and the shafts of said sprockets, each pair of said sockets being severally on substantially the longitudinal center line of said tracks, and a longitudinally adjustable brace extending between each pair of said sockets, said sockets and the ends of said braces being spherical to permit relative movement between said frames.

5. In a tractor of the crawler type, a main frame, a transmission casing mounted on said main frame, a track frame, an axle extending from said casing and forming a support for said track frame, a track supported on said track frame, a sprocket wheel for driving said track, a final drive casing extending from said main frame and forming a support for said sprocket, and a brace located in the space between said main frame and said sprocket and extending between said supports.

JOHN T. LIGGETT.